United States Patent
Zunft

(10) Patent No.: US 8,528,403 B2
(45) Date of Patent: Sep. 10, 2013

(54) VIBRATION COMPENSATION FOR YAW-RATE SENSORS

(75) Inventor: Steffen Zunft, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 644 days.

(21) Appl. No.: 12/655,440

(22) Filed: Dec. 29, 2009

(65) Prior Publication Data

US 2010/0199763 A1  Aug. 12, 2010

(30) Foreign Application Priority Data

Feb. 10, 2009 (DE) .......................... 10 2009 000 743

(51) Int. Cl.
*G01C 19/56* (2012.01)

(52) U.S. Cl.
USPC ...................................................... 73/504.12

(58) Field of Classification Search
USPC ............... 73/504.12, 504.14, 504.16, 504.15, 73/504.02, 504.04
See application file for complete search history.

(56) References Cited

U.S. PATENT DOCUMENTS

| | | | | |
|---|---|---|---|---|
| 4,951,508 | A * | 8/1990 | Loper et al. | 73/504.13 |
| 5,672,949 | A * | 9/1997 | Ward | 318/609 |
| 5,712,427 | A * | 1/1998 | Matthews | 73/504.04 |
| 6,553,833 | B1 * | 4/2003 | Funk et al. | 73/504.14 |
| 7,047,808 | B2 * | 5/2006 | Malvern et al. | 73/514.12 |
| 7,159,441 | B2 * | 1/2007 | Challoner et al. | 73/1.77 |
| 7,213,458 | B2 * | 5/2007 | Weber et al. | 73/504.12 |
| 7,444,869 | B2 * | 11/2008 | Johnson et al. | 73/504.12 |
| 7,523,663 | B2 * | 4/2009 | Willig et al. | 73/504.12 |
| 7,805,993 | B2 * | 10/2010 | Spahlinger | 73/504.02 |
| 2006/0191338 | A1 * | 8/2006 | Willig et al. | 73/504.12 |
| 2009/0056443 | A1 * | 3/2009 | Netzer | 73/504.12 |

FOREIGN PATENT DOCUMENTS

| | | |
|---|---|---|
| CN | 1499173 | 5/2004 |
| DE | 10 2004 061 804 | 7/2006 |

* cited by examiner

*Primary Examiner* — Helen Kwok
(74) *Attorney, Agent, or Firm* — Kenyon & Kenyon LLP

(57) ABSTRACT

A compensation circuit for a yaw-rate sensor includes a first evaluation unit for generating a quadrature-compensation signal, taking a differential value or cumulative value from a first and a second measured value into account. The compensation circuit has a second evaluation unit which is provided to generate a vibration-compensation signal, taking a cumulative value or differential value from the first and second acquired measured value into account. A corresponding detection circuit and a corresponding yaw-rate sensor are also described. A compensation method for a yaw-rate sensor includes the steps of acquiring a first and a second measured value at a detection-sensor element, generating a first differential value or cumulative value from the first and second measured value, generating a quadrature-compensation signal, taking the first differential value or cumulative value into account, generating a second cumulative value or differential value from the first and second measured value, and generating a vibration-compensation signal, taking the second cumulative value or differential value into account.

9 Claims, 2 Drawing Sheets

12 micromechanical sensor part
30 capacitance-voltage-transformer pair
40 oscillator-/drive unit
42 evaluation-/detection unit
48 A-D converter
52 PLL circuit
56 D-A converter
58 AGC controller
70 capacitance-voltage transformer
72 D-A converter
76 digital filter
78 D-A converter
84 output filter
86 second evaluation unit
88 A-D converter
92 filter 12 micromechanical sensor part
30 capacitance-voltage-transformer pair
40 oscillator-/drive unit
42 evaluation-/detection unit
48 A-D converter
52 PLL circuit
56 D-A converter
58 AGC controller
70 capacitance-voltage transformer
72 D-A converter
76 digital filter
78 D-A converter
84 output filter
86 second evaluation unit
88 A-D converter
92 filter

VIBRATION COMPENSATION FOR YAW-RATE SENSORS

RELATED APPLICATION INFORMATION

The present application claims priority to and the benefit of German patent application no. 10 2009 000 743.1, which was filed in Germany on Feb. 10, 2009, the disclosure of which is incorporated herein by reference.

FIELD OF THE INVENTION

The present invention relates to a compensation circuit for a yaw-rate sensor, the compensation circuit including a first evaluation unit for generating a quadrature-compensation signal, taking a differential value or cumulative value from a first and a second measured value into account. In addition, the present invention relates to a detection circuit for a yaw-rate sensor, the detection circuit having a modulator or multiplier for generating a yaw-rate signal that indicates a magnitude of a yaw rate of the yaw-rate sensor. The present invention further relates to a yaw-rate sensor which includes a drive unit. Moreover, the compensation method relates to a yaw-rate sensor.

BACKGROUND INFORMATION

In the yaw-rate sensor of German patent document 10 2004 061 804 A1, quadrature forces are generated which are necessary in order to suppress interference movements of the sensor element. The quadrature forces lead to an increased vibrational sensitivity of the yaw-rate sensor, that is, to a falsification of the yaw-rate value to be measured, with an, in reality, non-existing contribution to the measured yaw rate. The falsification of the measured value is also known as "virtual yaw rate."

An object of the exemplary embodiments and/or exemplary methods of the present invention is to provide a compensation circuit for a yaw-rate sensor, the compensation circuit furnishing measured yaw-rate values with no or at least a markedly reduced measured-value falsification due to vibrations. A further object of the exemplary embodiments and/or exemplary methods of the present invention is to provide a detection circuit for a yaw-rate sensor and a yaw-rate sensor having this advantage.

In addition, an object of the exemplary embodiments and/or exemplary methods of the present invention is to provide a corresponding compensation method for a yaw-rate sensor. These objectives are achieved by the combinations of features delineated in the independent claims. Advantageous specific embodiments of the present invention are set forth herein.

The exemplary embodiments and/or exemplary methods of the present invention builds on the compensation circuit of the species, in that the compensation circuit has a second evaluation unit which is provided to generate a vibration-compensation signal, taking a cumulative value or differential value from the first and second acquired measured value into account.

One specific embodiment provides for the second evaluation unit to have an input for a manipulated variable from a closed loop of a drive unit of the yaw-rate sensor.

The compensation circuit may have a summator or differentiator for generating a third cumulative value or differential value from the quadrature-compensation signal and the vibration-compensation signal.

In another specific embodiment, the first evaluation unit has a first filter, particularly a first low-pass filter or band-pass filter, and/or the second evaluation unit has a second filter, particularly a second low-pass filter.

The exemplary embodiments and/or exemplary methods of the present invention builds on a detection circuit of the species, in that the detection circuit includes a compensation circuit according to the invention.

The exemplary embodiments and/or exemplary methods of the present invention builds on a detection circuit of the species, in that the yaw-rate sensor includes a compensation circuit according to the invention or a detection circuit according to the invention.

In addition, the exemplary embodiments and/or exemplary methods of the present invention builds on a compensation method of the species, in that the compensation method includes the following steps: acquiring a first and a second measured value at a detection-sensor element; generating a first differential value or cumulative value from the first and second measured value; generating a quadrature-compensation signal, taking the first differential value or cumulative value into account; generating a second cumulative value or differential value from the first and second measured value; and generating a vibration-compensation signal, taking the second cumulative value or differential value into account.

The step of generating the vibration-compensation signal may include a modulation or multiplication by a manipulated variable from a closed loop of a drive unit of the yaw-rate sensor.

It is advantageous if the compensation method includes a further step in which a third cumulative value or differential value is generated from the quadrature-compensation signal and the vibration-compensation signal.

It may be especially preferred if the generation of the quadrature-compensation signal includes a first filtering, particularly a first low-pass filtering or band-pass filtering and/or if the generation of the vibration-compensation signal includes a second filtering, particularly a second low-pass filtering.

The present invention will now be elucidated based on the described exemplary embodiments with reference to the accompanying figures.

DETAILED DESCRIPTION

Figure 1:
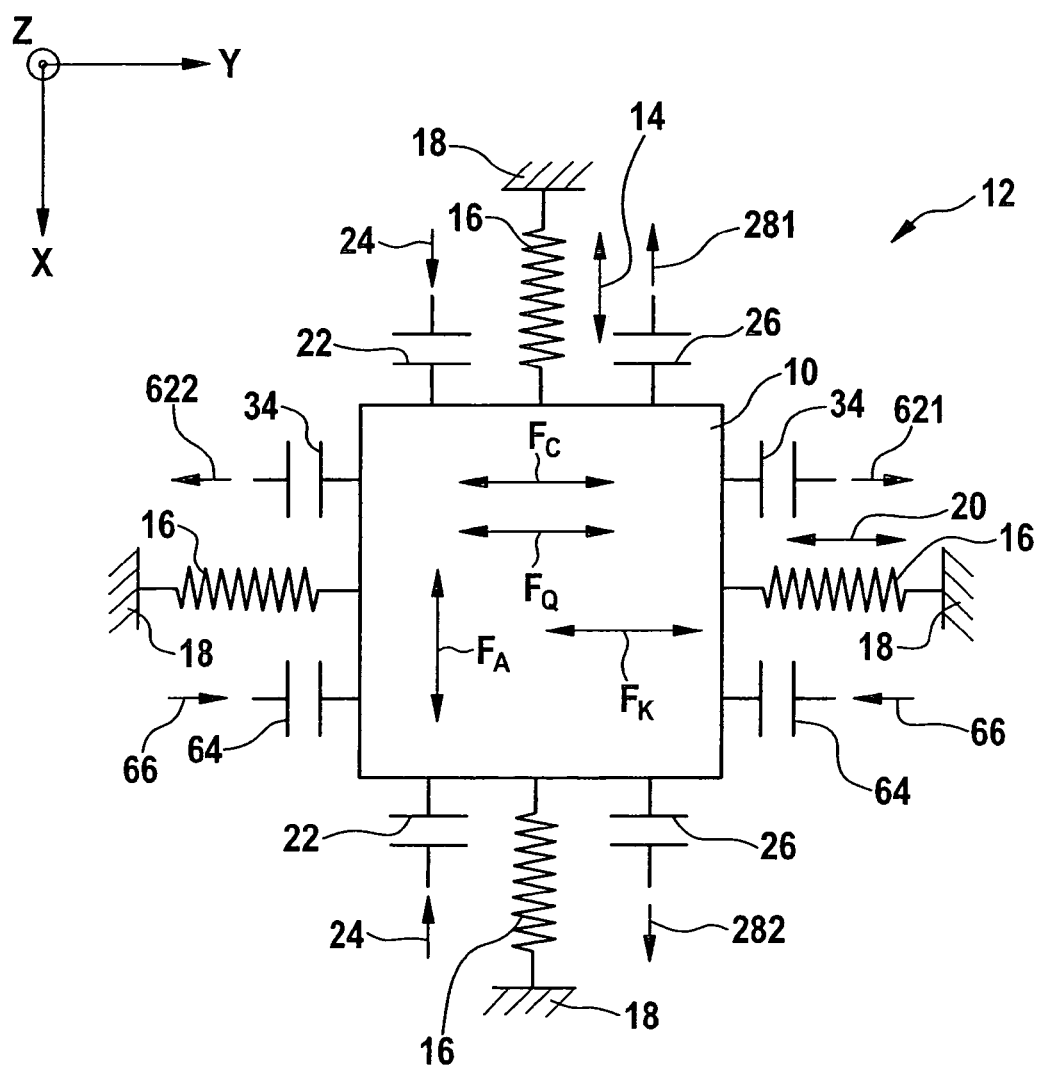
FIG. 1 shows schematically a micromechanical sensor part of a yaw-rate sensor.
Figure 2:
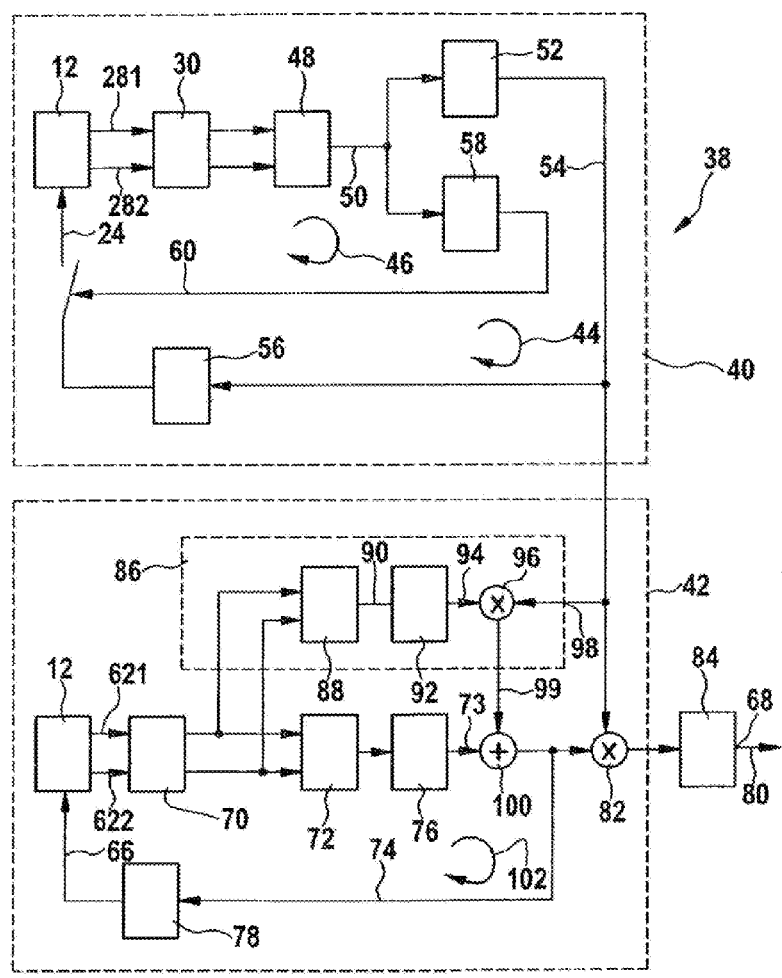
FIG. 2 shows a schematic block diagram of a first specific embodiment of the yaw-rate sensor according to the present invention.

The exemplary embodiments and/or exemplary methods of the present invention is described in the following using both figures simultaneously. In the case of vibration gyrometers, the Coriolis effect is used for determining an outer yaw rate $\Omega$. To that end, a seismic mass 10 (movable mass structure) of a micromechanical sensor part (Coriolis element) 12 is displaced at a velocity v in a first direction x. This is accomplished with the aid of a driving oscillation 14, having a frequency $\omega$. Seismic mass 10 is suspended on a substrate 18 by spring elements 16, seismic mass 10 being able to achieve a driving oscillation 14 (deflection) in a first direction x and a deflection 20 in a second direction y which is perpendicular to first direction x. Coriolis force $F_c = 2\,mv \times \Omega$ is proportional to the velocity and acts in second direction y, the vector of yaw rate $\Omega$ (rotational velocity) thus recorded pointing in a direction z which is oriented perpendicular to plane (x, y).

Yaw-rate sensor 38 includes an oscillator-/drive unit 40 and an evaluation-/detection unit 42. To form oscillator-/drive unit 40 for a seismic mass 10 driven with limited amplitude, a control loop 44 is employed to ensure the oscillatory condition and an AGC (automatic gain control) control loop 46 is employed to regulate a constant driving signal 24. In oscillator-/drive unit 40, mechanical oscillator 10, 16 is subject to a mechanical driving force $F_A$. To drive seismic mass 10 in first direction x, driving arrangement 22 is provided which are represented as capacitors, because they may be implemented capacitively. Driving arrangement 22 may be supplied with a driving signal 24, which is converted into a mechanical driving force $F_A$ in driving arrangement 22.

Also disposed at seismic mass 10 is drive-measuring arrangement 26 which, based on driving oscillation 14 of seismic mass 10 in first direction x, generate a pair of feedback signals 281, 282, which are conditioned by a capacitance-voltage-transformer pair 30 and a first differential analog-to-digital converter 48. In the specific embodiment shown, drive-measuring arrangement 26 is likewise capacitive, and are represented as capacitors. Conditioned feedback signal 50 is supplied to a PLL (phase-locked-loop) circuit 52, which generates a manipulated variable 54 from it. Manipulated variable 54 is supplied to a first digital-to-analog converter 56, which generates driving signal 24. In addition, conditioned feedback signal 50 is supplied to an AGC controller 58 for the automatic gain control, which generates an AGC signal 60 for influencing an intensity of driving signal 24 supplied to driving arrangement 22.

Due to imperfections in sensor element 10, a path-proportional interference deflection $x_Q$, also known as "quadrature interference" (or "quadrature" for short) also develops in the range of a frequency ω of driving oscillation 14. This interference deflection $x_Q$ of seismic mass 10 comes about as a result of a force $F_Q$ and is phase-shifted by 90° with respect to measurement deflection $x_C$, which is produced because of velocity-proportional Coriolis force $F_C$. Total deflection $x_M = x_C + x_Q$ in second direction y is a superimposition of measurement deflection $x_C$ and interference deflection $x_Q$. It is measured at measuring arrangement 34 and converted into a deflection signal 621, 622.

Measuring arrangements 34 are likewise capacitive and are represented as capacitors. Interference deflection $x_Q$ may have different directions. However, the vector component of interference deflection $x_Q$ in second direction y is crucial, because measuring arrangement 34 evaluates deflections $x_M$ in this direction y. To suppress interference deflection $x_Q$, compensation arrangement 64 is provided which acts on seismic mass 10. Compensation arrangement 64 here are likewise capacitive and are represented as capacitors. Compensation arrangement 64 may be supplied with a compensation driving signal 66 which is used to suppress interference signal $X_Q$ by an electrical arrangement, so that it is not apparent at sensor output 68.

Evaluation-/detection unit 42 shall now be explained. Velocity-proportional Coriolis force $F_C = 2\ mv \times \Omega$ brings about a measurement deflection 20 of seismic mass 10 in direction y, that is, at measuring arrangement 34, and therefore generation of an amplitude-modulated signal pair 621, 622 with frequency ω of driving oscillation 14. Signal pair 621, 622 is conditioned by a second capacitance-voltage-transformer pair 70 and a second differential analog-to-digital converter 72. The evaluation is accomplished using the principle of force compensation, that is, what is termed a "closed-loop" principle. In that case, deflection y of seismic mass 10 as a result of actions of force $F_C + F_Q$ due to Coriolis effects and quadrature interferences $X_Q$ is returned to zero with the aid of a compensation force $F_K$ impressed on sensor part 10. Forces $F_C$ and $F_Q$, together with a compensation force $F_R$ brought about by feedback signal 74, form a resultant force which acts on mechanical oscillator 10, 16. Because of this resultant force, a mechanical deflection of sensor part 10 occurs.

This deflection y is converted by second capacitance-voltage transformer 70 into electrical deflection signal 621, 622 and supplied to second differential digital-to-analog converter 72 and a digital filter 76, so that a negative-feedback signal 74 is obtained as control signal. This negative-feedback signal 74 is supplied to a second digital-to-analog converter 78 and converted into a compensation force $F_K$ for the return of deflection y of sensor part 10. Negative-feedback signal 74 also forms the basis for sensor-output signal 80. Negative-feedback signal 74 is subjected to a synchronous demodulation 82 with manipulated variable 54 of electrical driving signal 24. Path-proportional interference signals (quadrature) $X_Q$, which result indirectly from driving force $F_A$, are suppressed by this synchronous demodulation 82. An output filtering is thereupon carried out in an output filter 84, and consequently sensor-output signal 80 is obtained at output 68.

In the case of closed-loop yaw-rate sensors of the conventional type of construction, particularly out-of-plane yaw-rate sensors, with active quadrature compensation by resetting of modulated forces $F_Q$ in sensor part 10, a susceptibility to vibrate was observed, which falsifies the measuring results. Using analytical calculations, it was possible to verify that the disturbing susceptibility to vibrate in the low-frequency range is a result of a modulation of the vibration movement by forces $F_{QK}$, which are necessary to compensate for quadrature movement $x_Q$. The main influence on an acceleration in out-of-plane are quadrature forces $F_{QK}$, which are necessary to suppress interference movements $x_Q$ of sensor part 10: $F_{QK} = (\frac{1}{2})\epsilon(A/d)\ U^2$ (equation 1). For quadrature-compensation forces $F_{QK}$, the following applies: $A = b\ y\ \sin(\omega t)$ (equation 2). In the case of interference movements in the z-axis, a distance $d = d_0 + z\ \sin(\omega_{Interf} t)$ changes (Equation 3).

Thus, a force $F_{QK}$ results, which is a function of the following factor:

$$F_{QK} \approx \sin(\omega t)/(1+(z/d_0)\sin(\omega_{Interf} t)) \qquad \text{(Equation 4)}.$$

The expansion of the second term into a power series yields the following:

$$F_{QK} \approx \sin(\omega t)/(1-2(z/d_0)\sin(\omega_{Interf} t)+\ldots) \qquad \text{(Equation 5)}.$$

This corresponds to a modulation of the two forms of movement and generates forces $F_{QK}$ in the case of sidebands $\omega - \omega_{Interf}$ and $\omega + \omega_{Interf}$:

$$(\sin(\omega t))(\sin(\omega_{Interf} t)) = (\frac{1}{2})(\cos((\omega - \omega_{Interf})t) - \cos((\omega + \omega_{Interf})t)) \qquad \text{(Equation 7)}.$$

Due to the non-linear electrostatics of the (plate-type) capacitors, these forces $F_{QK}$ fold back to ω, and thus yield a signal which corresponds to a virtual yaw rate.

According to the exemplary embodiments and/or exemplary methods of the present invention, a vibration-compensation signal 99 describing these modulated force components $F_{QInterf}$ is simulated as accurately as possible in vibration-simulation circuit 86 (second evaluation unit 86) and fed back via a summator or differentiator 100 and existing compensation arrangement (electrodes) 64 to sensor part 10. Thus, the influence of the non-linearity of the electrostatics may be completely or largely eliminated or at least reduced considerably. To realize this type of compensation of interferences $X_{QInterf}$ caused by vibrations, (interfering) movement $X_{QInterf}$ caused by the vibration is recorded with the aid of a second analog-to-digital converter 88. Signal 90 thus recorded may be limited in bandwidth by a filter 92, in order to avoid annoying side effects of the vibration compensation. Output signal 94 of vibration-simulation circuit 86 thus ascertained, which contains virtual yaw-rate information, is modulated with manipulated variable 54 of drive unit 40 in a synchronous modulator 96 and fed additively with the aid of a summator or differentiator 100 into negative-feedback signal 74 of closed detection-control loop 102. Alternatively, signal 94 caused by the vibration component and recorded or derived may also be used for a digital compensation of ascertained yaw rate 80 or of a calculated offset error.

What is claimed is:

1. A compensation circuit for a yaw-rate sensor, comprising:
    a first evaluation unit to generate a quadrature-compensation signal, taking in to account a differential value or cumulative value from a first measured value and a second measured value; and
    a second evaluation unit to generate a vibration-compensation signal, taking in to account a cumulative value or differential value from the first measured value and the second measured value;
    wherein the second evaluation unit has an input for a manipulated variable from a closed loop of a drive unit of the yaw-rate sensor.

2. The compensation circuit of claim 1, wherein the compensation circuit has a summator or differentiator for generating a third cumulative value or differential value from the quadrature-compensation signal and the vibration-compensation signal.

3. The compensation circuit of claim 1, wherein at least one of the following is satisfied: (i) the first evaluation unit has a first filter, which is a first low-pass filter or a band-pass filter, and (ii) the second evaluation unit has a second filter, which is a second low-pass filter.

4. A detection circuit for a yaw-rate sensor, comprising:
    one of a modulator and a multiplier to generate a yaw-rate signal that indicates a magnitude of a yaw rate of the yaw-rate sensor; and
    a compensation circuit, including:
        a first evaluation unit to generate a quadrature-compensation signal, taking in to account a differential value or cumulative value from a first measured value and a second measured value; and
        a second evaluation unit to generate a vibration-compensation signal, taking in to account a cumulative value or differential value from the first measured value and the second measured value;
        wherein the second evaluation unit has an input for a manipulated variable from a closed loop of a drive unit of the yaw-rate sensor.

5. A yaw-rate sensor, comprising:
    a drive unit; and
    a compensation circuit, including:
        a first evaluation unit to generate a quadrature-compensation signal, taking in to account a differential value or cumulative value from a first measured value and a second measured value; and
        a second evaluation unit to generate a vibration-compensation signal, taking in to account a cumulative value or differential value from the first measured value and the second measured value;
        wherein the second evaluation unit has an input for a manipulated variable from a closed loop of a drive unit of the yaw-rate sensor.

6. A compensation method for a yaw-rate sensor, the method comprising:
    acquiring a first measured value and a second measured value at a detection-sensor element;
    generating a first differential value or a cumulative value from the first measured value and the second measured value;
    generating a quadrature-compensation signal, taking into account the first differential value or the cumulative value;
    generating a second cumulative value or a differential value from the first measured value and the second measured value; and
    generating a vibration-compensation signal, taking into account the second cumulative value or the differential value;
    wherein the generating of the vibration-compensation signal includes a modulation or a multiplication by a manipulated variable from a closed loop of a drive unit of the yaw-rate sensor.

7. The compensation method of claim 6, further comprising:
    generating a third cumulative value or differential value from the quadrature-compensation signal and the vibration-compensation signal.

8. The compensation method of claim 6, wherein at least one of the following is satisfied: (i) the generation of the quadrature-compensation signal includes a first filtering, which is a first low-pass filtering or a band-pass filtering, and (ii) the generation of the vibration-compensation signal includes a second filtering, which is a second low-pass filtering.

9. A yaw-rate sensor, comprising:
    a drive unit; and
    a detection circuit for the yaw-rate sensor, including:
        one of a modulator and a multiplier to generate a yaw-rate signal that indicates a magnitude of a yaw rate of the yaw-rate sensor; and
        a compensation circuit, including:
            a first evaluation unit to generate a quadrature-compensation signal, taking in to account a differential value or cumulative value from a first measured value and a second measured value; and
            a second evaluation unit to generate a vibration-compensation signal, taking in to account a cumulative value or differential value from the first measured value and the second measured value
            wherein the second evaluation unit has an input for a manipulated variable from a closed loop of a drive unit of the yaw-rate sensor.

* * * * *